United States Patent
Kojima

(10) Patent No.: US 7,672,673 B2
(45) Date of Patent: Mar. 2, 2010

(54) MOBILE COMMUNICATION SYSTEM, RELIEF METHOD OF COMPETITION BETWEEN DOWNLINK RRC MESSAGE AND INTER-CELL MOVEMENT OF USER EQUIPMENT, AND RADIO NETWORK CONTROLLER

(75) Inventor: Masahiko Kojima, Tokyo (JP)

(73) Assignee: NEC Corporation, Tokyo (JP)

( * ) Notice: Subject to any disclaimer, the term of this patent is extended or adjusted under 35 U.S.C. 154(b) by 1028 days.

(21) Appl. No.: 11/370,866

(22) Filed: Mar. 9, 2006

(65) Prior Publication Data

US 2006/0223537 A1    Oct. 5, 2006

(30) Foreign Application Priority Data

Mar. 31, 2005  (JP)  ............................. 2005-102804

(51) Int. Cl.
*H04W 72/00* (2009.01)
(52) U.S. Cl. .................... 455/450; 455/452.1; 370/329; 370/350
(58) Field of Classification Search .................. 455/436, 455/437, 438, 450, 451, 452.1, 412.1; 370/328, 370/338, 350, 329, 331, 469, 411, 477
See application file for complete search history.

(56) References Cited

U.S. PATENT DOCUMENTS

| 6,961,570 | B2 | 11/2005 | Kuo et al. | |
| 6,980,795 | B1 * | 12/2005 | Hermann et al. | 455/410 |
| 2002/0107019 | A1 | 8/2002 | Mikola et al. | |
| 2003/0016698 | A1 * | 1/2003 | Chang et al. | 370/469 |
| 2004/0043783 | A1 * | 3/2004 | Anderson | 455/522 |
| 2004/0203623 | A1 | 10/2004 | Wu | |
| 2004/0229626 | A1 * | 11/2004 | Yi et al. | 455/450 |
| 2005/0054298 | A1 | 3/2005 | Chen | |
| 2005/0094670 | A1 * | 5/2005 | Kim | 370/477 |

FOREIGN PATENT DOCUMENTS

| CN | 1494334 A | 5/2004 |
| CN | 1557104 A | 12/2004 |
| EP | 1 383 348 A1 | 1/2004 |
| EP | 1 408 658 A2 | 4/2004 |
| EP | 1 465 369 A1 | 10/2004 |
| JP | 2004-159297 | 6/2004 |

* cited by examiner

Primary Examiner—Jean A Gelin
(74) Attorney, Agent, or Firm—Foley & Lardner LLP

(57) ABSTRACT

The present invention provides a relief method of competition between a Down Link RRC message and inter-cell movement of user equipment which can continue communication even when acknowledgment of the Down Link RRC message cannot be performed. An RLC layer of the radio network controller (RNC) divides a Down Link RRC message into RLC AMD_PDU and transmits them, and gives an RLC error notice to an RRC layer from the RLC layer when a number of RLC AMD_PDU resending is exceeded because RLC ACK cannot be received from user equipment (UE). An RRC layer of the radio network controller activates a timer. When receiving CELL UPDATE within a fixed period, the RRC layer regards the RLC error as competition with inter-cell movement of the user equipment to reset the RLC layer of the radio network controller. The RRC layer of the radio network controller makes RLC RESET INDICATOR be TRUE in RRC: CELL UPDATE CONFIRM from the radio network controller so as to reset the RLC layer of the user equipment.

9 Claims, 3 Drawing Sheets

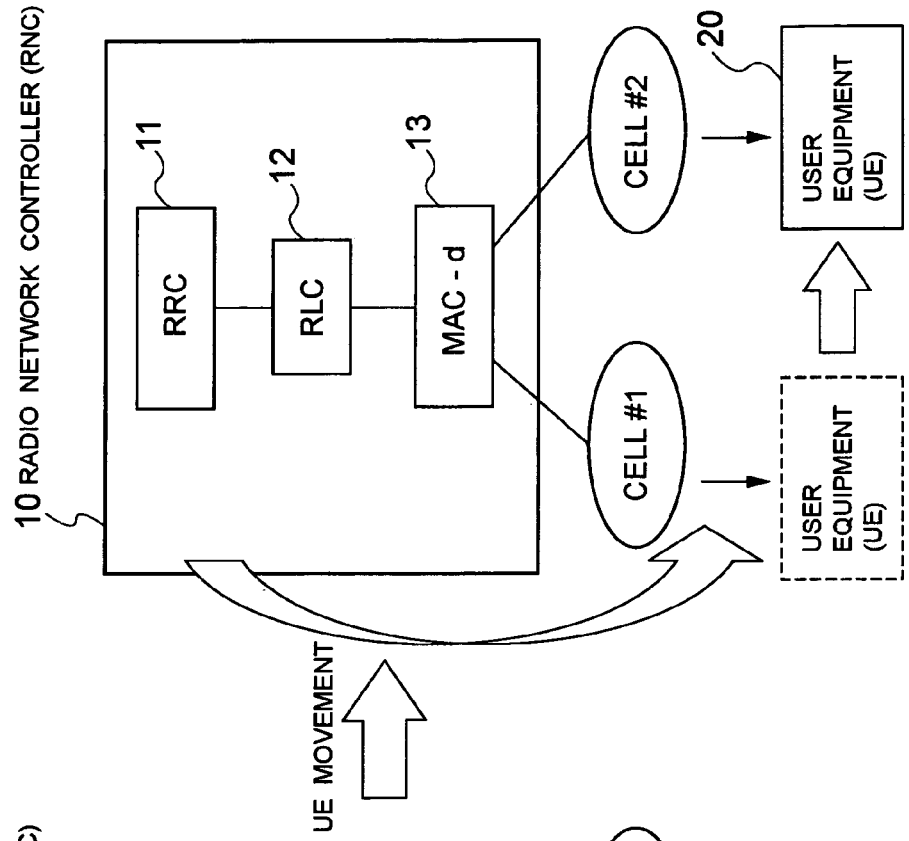
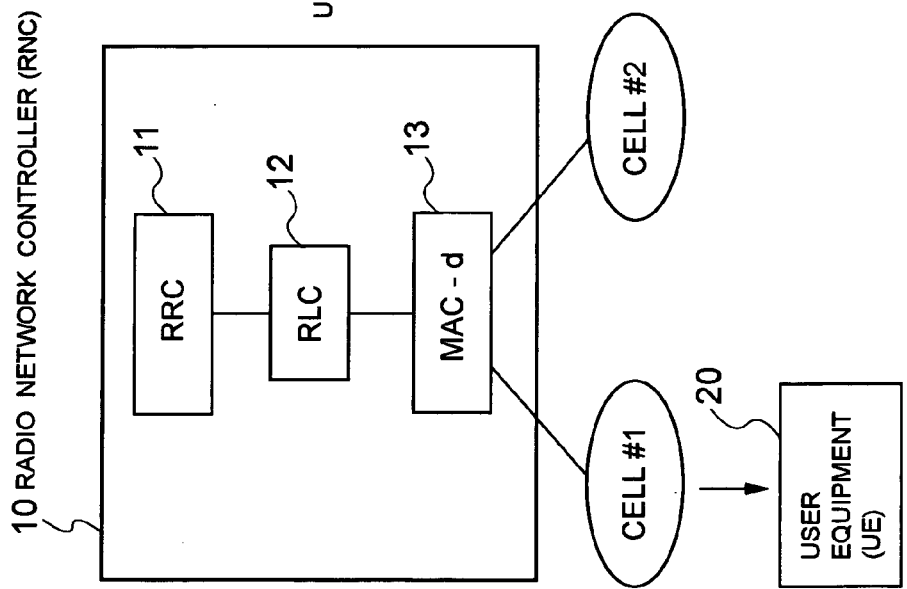

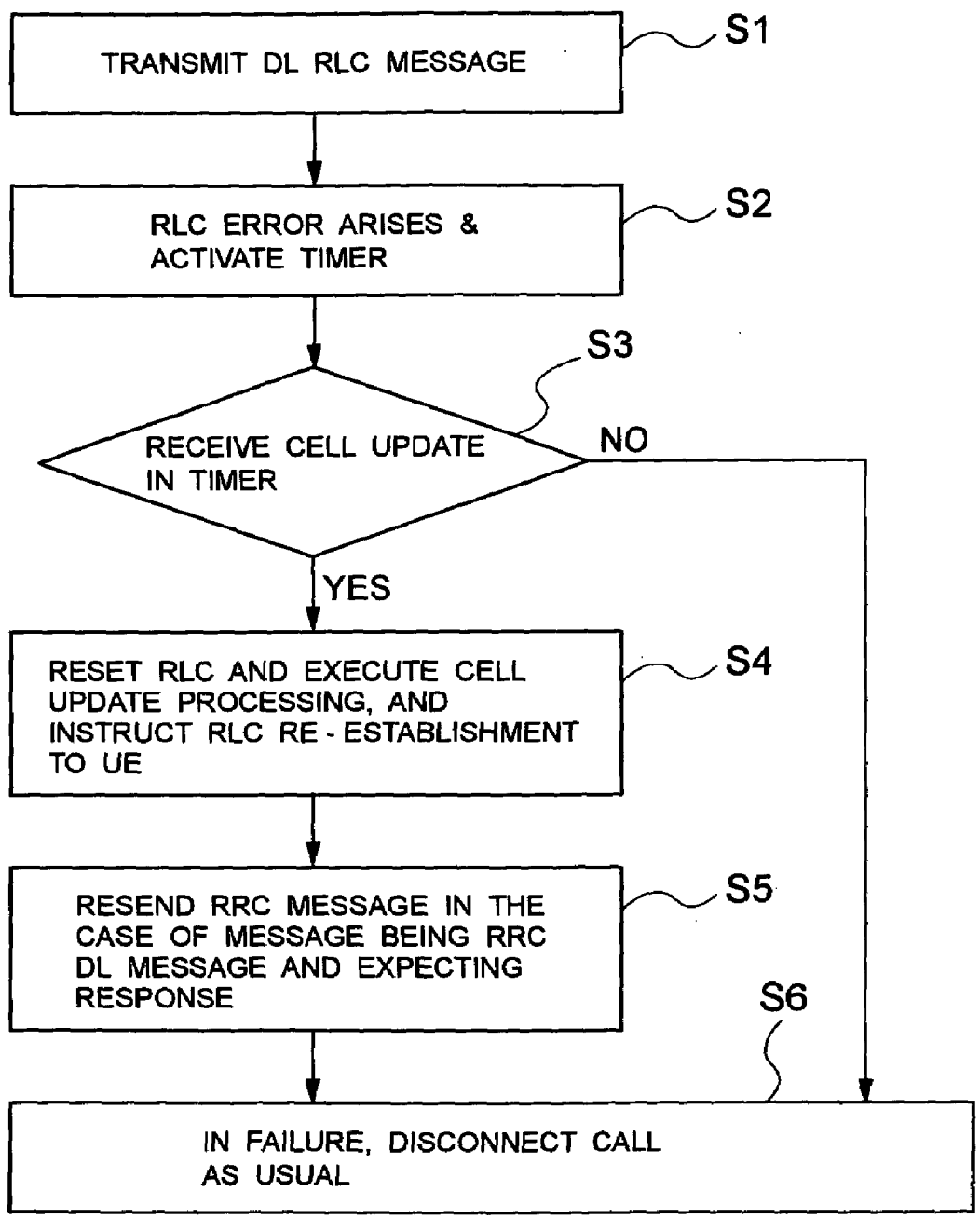

MOBILE COMMUNICATION SYSTEM, RELIEF METHOD OF COMPETITION BETWEEN DOWNLINK RRC MESSAGE AND INTER-CELL MOVEMENT OF USER EQUIPMENT, AND RADIO NETWORK CONTROLLER

BACKGROUND OF THE INVENTION

1. Field of the Invention

The present invention relates to a mobile communication system, a relief method of competition between a Down Link RRC message and inter-cell movement of user equipment, and a radio network controller.

2. Description of the Prior Art

In a mobile communication system constructed of a radio network controller (RNC) which has a Radio Resource Control (RRC) layer and a Radio Link Control (RLC) layer, which are defined in the 3rd Generation Partnership Project (3 GPP), and user equipment (UE), the user equipment in a CELL_FACH state can communicate with only a specific cell.

In addition, there is a processing method of securing a radio resource, which is distributed under a situation that an RRC supported by a mobile unit is not converted to a operating state from a pause state, not to be released carelessly (e.g., refer to Japanese Patent Laid-Open No. 2004-159297).

Nevertheless, since user equipment in a CELL_FACH state can receive a Down Link message only from one specific cell, the user equipment transfers a with-in range cell of itself to a radio network controller by CELL UPDATE processing when movement between cells arises. By this, a radio network controller can send a DL message for the user equipment to a cell. However, when the competition processing arises in the timing when a DL message, which a radio network controller transmits, and inter-cell movement of user equipment are almost simultaneous, that is, when the radio network controller has transmitted the DL message to an old cell before cell update procedure from user equipment which becomes a trigger is completed, the user equipment cannot receive the DL message.

Here, in the 3 GPP, in message transmission between user equipment and a radio network controller, an RLC acknowledged mode (RLC AM) which performs acknowledgment of the transmission in an RLC layer is defined. Therefore, when user equipment moves to another cell before the user equipment receives an RLC AM message which a radio network controller has transmitted, the radio network controller cannot receive RLC ACK which is a response to the message.

In this case, although RLC resending is performed up to a number of RLC AM_DATA resending (Max DAT) in the RRC layer of the radio network controller, when a number of RLC resending exceeds the above-mentioned number of resending, that is, when user equipment has already moved to another cell, a high order RRC layer is notified of an RLC alarm. In conventional processing, since RLC states between the user equipment and radio network controller become unmatched in the case of a CELL_FACH state by RLC alarm reception, the call is released.

Up to now, since acknowledgment could not be performed when a radio network controller transmitted an RLC AM, an RLC state became mismatched and the call was released. Nevertheless, the present invention aims at providing a relief method of competition between a Down Link RRC message and inter-cell movement of user equipment in a mobile communication system which can continue communication by resetting RLC and resending the RRC message if necessary.

BRIEF SUMMARY OF THE INVENTION

In order to solve the subjects mentioned above, the present invention is characterized by:

a mobile communication system which transmits a Down Link RRC message to user equipment from a radio network controller and receives a response message, comprising:

an RLC portion of the radio network controller which divides a Down Link RRC message into RLC AMD_PDU and transmits them, and gives an RLC error notice to an RRC portion from the RLC portion when a number of RLC AMD_PDU resending is exceeded because RLC ACK cannot be received from the user equipment; and an RRC portion of the radio network controller which activates a timer, regards the RLC error as competition with inter-cell movement of the user equipment to reset the RLC portion of the radio network controller, when receiving CELL UPDATE within a fixed period, and makes RLC RESET INDICATOR be TRUE in RRC:CELL UPDATE CONFIRM from the radio network controller so as to reset the RLC portion of the user equipment;

a relief method of competition between a Down Link RRC message and inter-cell movement of user equipment in a mobile communication system which transmits the Down Link RRC message to the user equipment from a radio network controller and receives a response message, the relief method of competition between a Down Link RRC message and inter-cell movement of user equipment in a mobile communication system comprises the steps of:

dividing in an RLC portion of the radio network controller a Down Link RRC message into RLC AMD_PDU and transmitting them, and giving an RLC error notice to an RRC portion from the RLC portion when a number of RLC AMD_PDU resending is exceeded because RLC ACK cannot be received from the user equipment;

activating in an RRC portion of the radio network controller a timer, regarding the RLC error as competition with inter-cell movement of the user equipment to reset the RLC portion of the radio network controller, when receiving CELL UPDATE within a fixed period; and making in the RRC portion of the radio network controller RLC RESET INDICATOR be TRUE in RRC:CELL UPDATE CONFIRM from the radio network controller so as to reset the RLC portion of the user equipment; and a radio network controller of a mobile communication system which transmits a Down Link RRC message to user equipment from a radio network controller and receives a response message, the radio network controller comprising:

an RLC portion of the radio network controller which divides a Down Link RRC message into RLC AMD_PDU and transmits them, and gives an RLC error notice to an RRC portion from the RLC portion when a number of RLC AMD_PDU resending is exceeded because RLC ACK cannot be received from the user equipment; and an RRC portion of the radio network controller which activates a timer, regards the RLC error as competition with inter-cell movement of the user equipment to reset the RLC portion of the radio network controller, when receiving CELL UPDATE within a fixed period, and makes RLC RESET INDICATOR be TRUE in RRC:CELL UPDATE CONFIRM from the radio network controller so as to reset the RLC portion of the user equipment.

BRIEF DESCRIPTION OF THE DRAWINGS

FIGS. 1A and 1B are explanatory diagrams showing relation between a radio network controller and user equipment which construct a mobile communication system according to the present invention;

FIG. 3 is a flowchart explaining processing of a relief method of competition between a Down Link RRC message and inter-cell movement of user equipment according to the present invention.

DETAILED DESCRIPTION OF THE PREFERRED EMBODIMENTS

Figure 2:
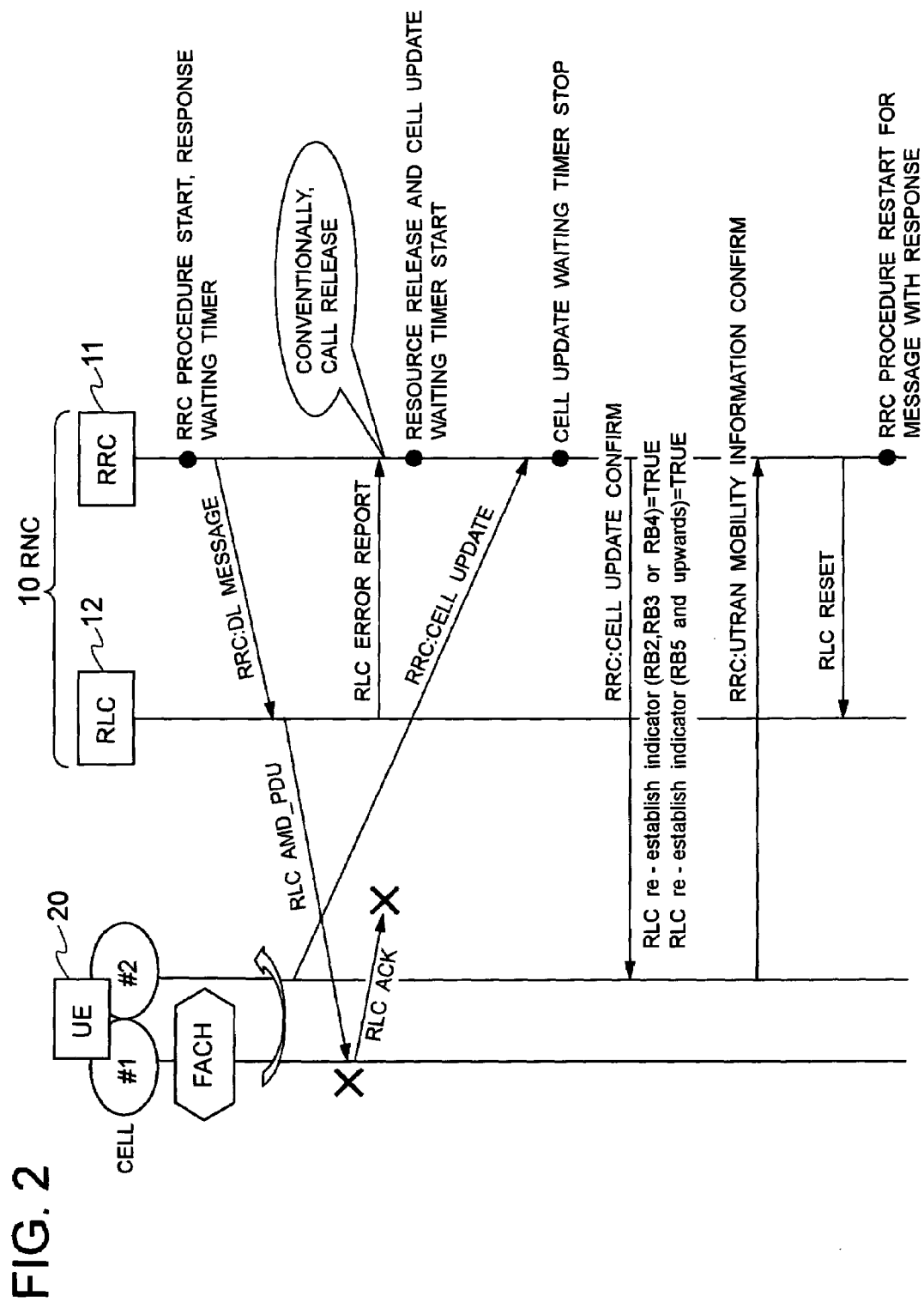
FIG. 2 is a sequence chart showing message transmission and reception between a radio network controller and user equipment of the mobile communication system according to the present invention.

Next, preferred embodiments of the present invention will be described with referring to drawings.

FIGS. 1A and 1B are explanatory diagrams showing relation between a radio network controller (RNC) and user equipment (UE) which construct a mobile communication system according to the present invention.

A radio network controller 10 comprises an RRC layer 11, an RLC layer 12 and a MAC (Medium Access Control)-d protocol 13.

A radio network controller 10 has a plural of the base station (not shown) and each base station has a cell, for example, Cell#1 or Cell#2. User equipment 20 exists under the Cell#1 at the beginning (refer to FIG. 1A), and moves to under the Cell#2 after that (refer to FIG. 1B).

An RLC layer 12 of the radio network controller 10 divides a Down Link RRC message (RLC AM message) from the radio network controller into RLC acknowledged mode data_protocol data units (RLC AMD_PDU), which are transmitted in a Medium Access Control (MAC)-d protocol 13. When user equipment has moved to another cell at that time, the RLC layer 12 of the radio network controller cannot receive RLCACK, and hence, the number of RLCAMD_PDU resending is exceeded. Hence, the RLC layer 12 gives an RLC error notice to an RRC layer 11 of the radio network controller 10.

The RRC layer 11 of the radio network controller 10 activates a timer. When receiving CELL UPDATE within a fixed period, the RRC layer 11 regards the above-mentioned RLC error as competition with movement between cells to reset the RLC layer 12 of the radio network controller 10. In addition, the RRC layer 11 of the radio network controller 10 makes RLC RESET INDICATOR be TRUE by RRC: CELL UPDATE CONFIRM from the radio network controller 10 so as to reset the RLC layer of the user equipment 20 also for the user equipment 20. Hence, it is possible to continue communication by resetting the RLC in both of the radio network controller 10 and user equipment 20. A1

A Down Link RRC message has not reached user equipment 20 even if a communicating state is continued as mentioned above. Hence, there is a possibility that a state in an RLC upper layer may be unmatched, and hence, there may be a problem as the whole call processing. Therefore, by the radio network controller side resending the DL RRC message for the RRC message which has a RESPONSE message in the Down Link RRC message, it is possible to perform continuation of the RLC layer and to keep the state in the RRC layer between the user equipment 20 and radio network controller 10.

In addition, examples of the RRC message which has a RESPONSE message in a Down Link RRC message are as follows:
RRC SECURITY MODE COMMAND
RRC RADIO BEARER SETUP
RRC RADIO BEARER RELEASE
RRC PHYSICAL CHANNEL RECONFIGURATION (at the time of CTS CELL_FACH TO CELL PCH)
RRC TRANSPORT CHANNEL RECONFIGURATION (at the time of CTS CELL_FACH TO CELL_DCH)

As for each message, the following processing is performed according to a state of the RRC layer.
(Case of CELL_FACH)
As for Security Mode Control, an RLC layer of a radio network controller 10 is rolled back in old secrecy construction, and Security Mode Procedure is retried once after Cell Update is completed. A second retry is regarded as a failure, and the failure is transferred to a Core Network (CN).
As for first RAB Establishment (CELL_FACH TO CELL_DCH), RAB Setup is retried after completion of Cell Update, and when it is the second time, RAB Setup is taken as a Failure for Cell Update to be completed. Then, the failure is transferred to the CN in RANAP:RAB ASSIGNMENT RESPONSE.
As for a first RAB Release (CELL_FACH TO CELL_DCH), the RAB Release Procedure is restarted from the point where it was interrupted, after completion of Cell Update. When it is the second time, RAB Release is taken as a Failure and Cell Update is completed. Then, the failure is transferred to the CN in RANAP:RAB ASSIGNMENT RESPONSE.
As for a first Physical Channel Reconfiguration (CELL_FACH TO CELL_PCH), Channel Type Switching (CTS) is retried after completion for Cell Update. When it is the second time, the CTS is taken as a Failure, Cell Update is completed, and CELL_FACH is kept as it is.
As for a first Channel Type Switching (CELL_FACH TO CELL_DCH), the CTS is retried after completion of Cell Update. When it is the second time, RRC Connection Release is executed.
(Case of Cell_DCH)
In Security Mode Control/RAB Establishment/RAB Release, this is taken as a Failure and Cell Update is executed.
In Channel Type Switching (CELL_FACH TO CELL_DCH), Cell update ('RL failure' or 'RLC unrecoverable error') is disregarded, and processing is continued.

FIG. 2 is a sequence chart showing message transmission and reception between the radio network controller 10 and user equipment 20 of the mobile communication system according to the present invention. FIG. 3 is a flowchart explaining processing of a relief method of competition between a Down Link RRC message and inter-cell movement of user equipment 20 in the mobile communication system according to the present invention.

The RLC layer 12 of the radio network controller 10 divides a Down Link RRC message (RMC AM Message), which is transmitted from the RRC layer 11 of the radio network controller 10, into RLC AMD_PDU and transmits them (step S1 in FIG. 3). When the user equipment 20 has moved to another cell at the time, the RLC layer 12 of the radio network controller 10 cannot receive RLC ACK from the user equipment 20, and hence, the number of RLC AMD_PDU resending is exceeded. Then, an RLC error notice is given to the RRC layer 11 of the radio network controller 10 (step S2).

The RRC layer 11 of the radio network controller 10 activates a timer. When receiving CELL UPDATE from the user equipment 20 within a fixed period (step S3), the RRC layer 11 regards the above-mentioned RLC error as competition with the inter-cell movement of the user equipment 20 to reset the RLC layer 12 of the radio network controller 10. In addition, also for the user equipment 20, so as to reset the RLC layer of the user equipment 20, the RRC layer 11 makes RLC RESET INDICATOR be TRUE in RRC:CELL UPDATE CONFIRM from the RRC layer 11 of the radio network controller 10. Hence, communication is continued by resetting the RLC in both of the radio network controller 10 and user equipment 20 (step S4).

However, in the case of AM_RLC error indication (RB2, RB3 or RB4)=TRUE in RRC:CELL UPDATE from the user equipment 20, a state of a layer upper than RLC, such as RRC may become unmatched between the user equipment 20 and radio network controller 10 since a UL RRC message from the user equipment 20 falls out. Hence, the call is released.

During Channel Type Switching (CELL_DCH to CELL_FACH), the RLC layer of the radio network controller 10 cannot receive RLC ACK from the user equipment 20 after PHYSICAL CHANNEL RECONFIGURATION is transmitted for CTS in a CELL_DCH state. Hence, in the past, when the RRC layer of the radio network controller 10 received an RLC error report, the call was released.

When this is associated with the fundamental operation in the above-mentioned CELL_FACH state, the RRC 11 does not release the call at the time reception of an RLC error report to wait Cell Update. Hence, the above-mentioned waiting timer for Cell update is started. The timer is stopped at the time of reception of RRC:CELLUPDATE, and a resource for common CH is set. The radio network controller 10 makes the CELL_FACH state commonly without reception of PHYSICAL CHANNELRECONFIGURATION COMPLETE.

A Down Link RRC message has not reached the user equipment 20 even if an error is cancelled as a communicating state as mentioned above. Hence, there is a possibility that a state in an RLC upper layer may be unmatched, and hence, there may be a problem as the whole call processing. Therefore, the radio network controller 10 performs resending processing for the RRC message which has a RESPONSE message in the Down Link RRC message (step S5).

When it still fails, connection is disconnected as usual (step S6).

According to the present invention, even in a CELL_FACH state receivable only from one specific cell, call release is avoidable even in the case which was made disconnected in the past by continuing call setting processing in the case that a Down Link RRC message and inter-cell movement of user equipment 20 compete.

What is claimed is:

1. A mobile communication system which transmits a Down Link RRC message to user equipment from a radio network controller and receives a response message, comprising:

an RLC portion of the radio network controller which divides a Down Link RRC message into RLC AMD_PDU and transmits them, and gives an RLC error notice to an RRC portion from the RLC portion when a number of RLC AMD_PDU resending is exceeded because RLC ACK cannot be received from the user equipment; and an RRC portion of the radio network controller which activates a timer to count up to a fixed period upon receipt of the RLC error notice, regards the RLC error as competition with inter-cell movement of the user equipment to reset the RLC portion of the radio network controller and stops the timer, when receiving CELL UPDATE within the fixed period, and makes RLC RESET INDICATOR be TRUE in RRC:CELL UPDATE CONFIRM from the radio network controller so as to reset the RLC portion of the user equipment.

2. The mobile communication system according to claim 1, wherein the RRC portion is in a CELL_FACH state.

3. The mobile communication system according to claim 1, wherein when the CELL UPDATE is received after the fixed period, as determined by the timer, the RLC portion of the user equipment and the RLC portion of the radio network controller are not reset.

4. A relief method of competition between a Down Link RRC message and inter-cell movement of user equipment in a mobile communication system which transmits the Down Link RRC message to the user equipment from a radio network controller and receives a response message, the relief method of competition between a Down Link RRC message and inter-cell movement of user equipment in a mobile communication system comprises the steps of:

dividing in an RLC portion of the radio network controller a Down Link RRC message into RLC AMD_PDU and transmitting them, and giving an RLC error notice to an RRC portion from the RLC portion when a number of RLC AMD_PDU resending is exceeded because RLC ACK cannot be received from the user equipment;

activating in an RRC portion of the radio network controller a timer to count up to a fixed period upon receipt of the RLC error notice, regarding the RLC error as competition with inter-cell movement of the user equipment to reset the RLC portion of the radio network controller and to stop the timer, when receiving CELL UPDATE within the fixed period; and making in the RRC portion of the radio network controller RLC RESET INDICATOR be TRUE in RRC:CELL UPDATE CONFIRM from the radio network controller so as to reset the RLC portion of the user equipment.

5. The relief method of competition between a Down Link RRC message and inter-cell movement of user equipment in a mobile communication system according to claim 4, wherein the RRC portion is in a CELL_FACH state.

6. The relief method of competition between a Down Link RRC message and inter-cell movement of user equipment in a mobile communication system according to claim 4, wherein when the CELL UPDATE is received after the fixed period, as determined by the timer, the RLC portion of the user equipment and the RLC portion of the radio network controller are not reset.

7. A radio network controller of a mobile communication system which transmits a Down Link RRC message to user equipment from a radio network controller and receives a response message, the radio network controller comprising:

an RLC portion of the radio network controller which divides a Down Link RRC message into RLC AMD_PDU and transmits them, and gives an RLC error notice to an RRC portion from the RLC portion when a number of RLC AMD_PDU resending is exceeded because RLC ACK cannot be received from the user equipment; and an RRC portion of the radio network controller which activates a timer to count up to a fixed period upon receipt of the RLC error notice, regards the RLC error as competition with inter-cell movement of the user equipment to reset the RLC portion of the radio network controller and to stop the timer, when receiving CELL UPDATE within the fixed period, and makes RLC RESET INDICATOR be TRUE in RRC:CELL UPDATE CONFIRM from the radio network controller so as to reset the RLC portion of the user equipment.

8. The radio network controller according to claim 7, wherein the RRC portion is in a CELL_FACH state.

9. The radio network controller according to claim 7, wherein when the CELL UPDATE is received after the fixed period, as determined by the timer, the RLC portion of the user equipment and the RLC portion of the radio network controller are not reset.

* * * * *